United States Patent
Szita

(10) Patent No.: US 6,985,327 B2
(45) Date of Patent: Jan. 10, 2006

(54) METHOD AND CONTROL SCHEME FOR COMPENSATING THE COARSE ACTUATORS UNDESIRED TRANSIENTS IN DUAL STAGE CONTROL SYSTEMS

(75) Inventor: Gabor Szita, Newark, CA (US)

(73) Assignee: Seagate Technology LLC, Scotts Valley, CA (US)

(*) Notice: Subject to any disclaimer, the term of this patent is extended or adjusted under 35 U.S.C. 154(b) by 452 days.

(21) Appl. No.: 09/958,782

(22) PCT Filed: Oct. 12, 2001

(86) PCT No.: PCT/US00/26289

§ 371 (c)(1),
(2), (4) Date: Oct. 12, 2001

(87) PCT Pub. No.: WO01/22409

PCT Pub. Date: Mar. 29, 2001

(65) Prior Publication Data

US 2002/0171967 A1 Nov. 21, 2002

Related U.S. Application Data

(60) Provisional application No. 60/155,680, filed on Sep. 23, 1999.

(51) Int. Cl.
G11B 5/596 (2006.01)

(52) U.S. Cl. .................................................. 360/78.05
(58) Field of Classification Search ............. 360/78.05, 360/69, 77.04, 78.12, 75, 294.4, 294.6, 78.06; 369/44.11; 318/561, 632; 700/44, 77
See application file for complete search history.

(56) References Cited

U.S. PATENT DOCUMENTS

| | | | |
|---|---|---|---|
| 3,657,524 A * | 4/1972 | Bakke | 700/77 |
| 3,924,268 A | 12/1975 | McIntosh et al. | |
| 4,200,827 A * | 4/1980 | Oswald | 318/561 |
| 4,736,353 A * | 4/1988 | Kasai et al. | 369/30.15 |
| 5,177,652 A | 1/1993 | Yamaguchi et al. | |
| 5,189,578 A | 2/1993 | Mori et al. | |
| 5,305,158 A * | 4/1994 | Ueda et al. | 360/75 |
| 5,317,550 A * | 5/1994 | Semba | 369/30.2 |
| 5,402,400 A * | 3/1995 | Hamada et al. | 360/78.06 |
| 5,452,275 A * | 9/1995 | Ogawa | 369/44.11 |
| 5,623,461 A | 4/1997 | Sohmuta | |

(Continued)

FOREIGN PATENT DOCUMENTS

| | | |
|---|---|---|
| EP | 0924689 A2 | 6/1999 |
| JP | 2-263369 | 10/1990 |

Primary Examiner—David Hudspeth
Assistant Examiner—Fred F. Tzeng
(74) Attorney, Agent, or Firm—David K. Lucente; Derek J. Berger

(57) ABSTRACT

A compensation element (317) in a feedforward line in a dual stage control system for a data storage system compensates for the undesired transient motion of a first positioning element (i.e., a coarse actuator). The compensation element is a transfer function that is applied from the first positioning element's control signal ($U_v$) to a second positioning elements's (306) (i.e., microactuator's) input. The transfer function is defined as formula (I) where $\hat{V}_{nom}(z)$ is a transfer function model of the nominial portion of the first positioning element, $\hat{V}_{res}(z)$ is a transfer function model of the resonance portion of the first positioning element, and $\hat{M}(z)$ is a transfer function model of the dynamics of the second positioning element. This feedforward transfer function effectively cancels the resonances of the first positioning element without requiring the inversion of the resonance transfer function.

20 Claims, 4 Drawing Sheets

U.S. PATENT DOCUMENTS

| | | | |
|---|---|---|---|
| 5,710,497 A * | 1/1998 | Yanagimachi | 318/632 |
| 5,745,319 A | 4/1998 | Takekado et al. | |
| 5,796,558 A * | 8/1998 | Hanrahan et al. | 360/294.6 |
| 5,856,896 A | 1/1999 | Berg et al. | |
| 5,862,015 A | 1/1999 | Evans et al. | |
| 5,920,441 A * | 7/1999 | Cunningham et al. | 360/78.05 |
| 6,005,742 A * | 12/1999 | Cunningham et al. | 360/78.05 |
| 6,049,441 A * | 4/2000 | Ottesen | 360/77.04 |
| 6,088,187 A | 7/2000 | Takaishi | |
| 6,101,058 A * | 8/2000 | Morris | 360/69 |
| 6,160,676 A * | 12/2000 | Takaishi | 360/78.05 |
| 6,295,184 B1 * | 9/2001 | Takekado | 360/294.4 |
| 6,320,720 B1 * | 11/2001 | Hattori | 360/78.05 |
| 6,470,225 B1 * | 10/2002 | Yutkowitz | 700/44 |
| 6,490,118 B1 * | 12/2002 | Ell et al. | 360/77.04 |
| 6,493,177 B1 * | 12/2002 | Ell et al. | 360/78.05 |
| 6,583,964 B1 * | 6/2003 | Huang et al. | 360/294.4 |
| 6,587,303 B1 * | 7/2003 | Bui et al. | 360/78.12 |
| 6,600,619 B1 * | 7/2003 | Morris et al. | 360/75 |

* cited by examiner

METHOD AND CONTROL SCHEME FOR COMPENSATING THE COARSE ACTUATORS UNDESIRED TRANSIENTS IN DUAL STAGE CONTROL SYSTEMS

RELATED APPLICATIONS

This is a continuation under 35 U.S.C. 371 of PCT/US00/26289 filed 22 Sep. 2000, which claims priority to U.S. Provisional patent application No. 60/155,680 filed 23 Sep. 1999.

TECHNICAL FIELD

The present invention relates to data storage systems, and more particularly to a control scheme for a dual stage control system in a data storage system. Still more particularly, the present invention relates to a method and control scheme for compensating the coarse actuators undesired transients in dual stage control systems.

BACKGROUND

In several data storage systems, such as hard disk drives, the recording head (or heads) is positioned over the disk surface by a rotary or linear actuator. The actuator is moved, or positioned, by a motor. With disk drive systems, a voice coil motor moves the actuator. A voice coil motor is, in simple terms, a coil between two magnets. To move the actuator, a current is applied to the coil to induce a force, and this force moves the actuator.

A recording head reads data from, and/or writes data to, the disk. So positioning the recording head accurately is very important in data storage systems. Typically, the recording head is located at one end of the actuator. But accurate positioning of the recording head can be difficult due to the transient motion created when the actuator and head are moved. Since the actuator is similar to a long beam, moving it causes the actuator to oscillate, or resonate. And this in turn causes the recording head to oscillate. This oscillation, or resonance, makes accurate positioning of the recording head difficult.

One conventional method for compensating for the oscillations of the recording head is to determine the structure of the actuator and recording head in detail. Once known, the movement of the actuator and head can be determined and the resonant frequencies calculated. A control system can then be designed to cause the motor to move in a direction contrary to the transient motion, thereby minimizing, or canceling, the resonance frequencies. A limitation to this method however, lies in the fact that the actuator and recording head oscillate in several directions, thus creating a high number of differing resonance frequency states. Unfortunately, this causes the control system to be complex, which in turn causes the cost of developing and manufacturing such a control system to be high.

To overcome the limitations of the one stage control system described above, dual stage control systems have been proposed. In a dual stage control system, a microactuator is combined with a coarse actuator. A coarse actuator is usually a conventional actuator, while a microactuator typically moves the recording head only. In this type of control system, the actuator is used for the coarse positioning of the recording head, while the microactuator is used for high speed, high accuracy positioning of the recording head.

The design of dual stage control systems, however, is much more complicated than the single stage control system. Anticipating and effectively compensating for the high frequency transient motion of the actuator and recording head is challenging. The undesired transient motion is usually generated by the actuator, suspension, and gimball resonances A typical method of compensation utilizes transfer function models of the coarse actuator and the microactuator. One conventional control scheme for compensating the coarse actuators undesired transients in dual stage control systems in shown in the block diagram of FIG. 1. Blocks 108, 110, 114 and 130 in FIG. 1 represent mathematical functions that can be implemented in software and/or hardware.

The control scheme 100 includes a controller 102, a coarse actuator 104, and a microactuator 106. The coarse actuator 104 is comprised of a $V_{nom}$ block 108 and a $V_{res}$ block 110. $V_{nom}$ is usually an ideal frictionless model, or transfer function, of the coarse actuator 104. For voice coil motor actuators, such as the ones found in hard disk drives, the most frequently used transfer function for the nominal model is $V_{nom}(s)=1/s^2$, where s is the Laplace transform operator. The resonant portion of the coarse actuator, $V_{res}$, is usually determined via finite element analysis of the mechanical structure and/or frequency domain measurements.

The controller 102 is comprised of a control block 112 and a filter 114. Controller 102 is typically a state variable feedback controller. Certain types of microactuators 106 allow explicit measurement of their displacement, and this measurement may be fed back to the controller 102 via line 115.

The position of the recording head relative to the storage medium is measured by means of special servo marks written on, or formed in, the storage medium. The current position of the recording head (y) is fed back as input into controller 102 via line 116. A previously presented position for the recording head (a previously presented specific location where the head is to be moved to) is input into the controller via line 118. Control block 112 then generates two signals, one on line 120 and the other on line 122. The signal on line 120 is input into anti-resonance filter 114 to generate a previously presented signal, $u_v$, on line 123. Filter 114 is used to compensate for the resonance of the coarse actuator, and is described in greater detail below.

The signal $u_v$ is input into the coarse actuator 104, where the transfer functions $V_{nom}$ and $V_{res}$ are applied to the signal $u_v$ to generate a signal $y_v$ on line 124. In hard disk drive systems, $u_v$ is the current used to move the coarse actuator, and the signal $y_v$ represents the positioning motion of the coarse actuator. The signal $u_m$ on line 122 is input into microactuator 106 and causes the microactuator 106 to move. The microactuator 106 then generates a signal $y_m$ on line 126, which represents the positioning motion of the microactuator 106. The position of the recording head (y) on line 128 is the sum of the coarse actuator's motion $y_v$ and the microactuator's motion $y_m$, as shown in block 130.

To simplify the controller structure and the design procedure, the controller 102 is usually designed for the nominal portion of the coarse actuator ($V_{nom}$), neglecting the resonances, $V_{res}$. To minimize the influence the resonances have on the system, a cascade anti-resonance filter 114 is applied. The anti-resonance filter 114 approximates the inverse of the resonance model, i.e. $C(s)=1/V_{res}(s)$. Thus, the resonant portion of the coarse actuator is cancelled out by inverting the resonance transfer function, $V_{res}$.

One limitation to this method, however, is that in many cases $V_{res}$ contains unstable (right half s-plane) zeros. When an unstable zero is inverted, an unstable pole is created. This results in an unstable pole-zero cancellation, which makes the system unstable (i.e., can not control the motion), and may result in complete failure of the control system.

SUMMARY OF THE INVENTION

The present invention overcomes the limitations of the prior art by utilizing a compensation element in a feedforward line from a first positioning element's control signal to a second positioning element's input. In an exemplary embodiment the first positioning element is a coarse actuator and the second positioning element is a microactuator, so that the compensation element is utilized from the coarse actuator's control signal $u_v$ to the microactuator's input $u_m$. In the exemplary embodiment described herein, the compensation element is a transfer function. This transfer function is defined as:

$$\hat{V}_{nom}(z) \frac{1 - \hat{V}_{res}(z)}{\hat{M}(z)}$$

where $\hat{V}_{nom}(z)$ is a transfer function model of the nominal portion of the first positioning element, $\hat{V}_{res}(z)$ is a transfer function model of the resonance portion of the first positioning element, and $\hat{M}(z)$ is a transfer function model of the second positioning element dynamics. The compensation element generates a compensation signal that is input into the second positioning element to compensate for the undesired transient motion from the first positioning element.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

DETAILED DESCRIPTION

The present invention relates to a method and control scheme for compensating the coarse actuators undesired transients in dual stage control systems. The following description is presented to enable one of ordinary skill in the art to make and use the invention and is provided in the context of a specific embodiment, namely a hard disk drive system. However, the present invention is not limited to this embodiment. Various modifications to the specific embodiments will be readily apparent to those skilled in the art and the generic principles herein may be applied to other implementations that require very accurate positioning in a control system having dual stages of control. Thus, the present invention is not intended to be limited to the embodiment shown but is to be accorded the widest scope consistent with the appended claims and with the principles and features described herein.

Figure 1:
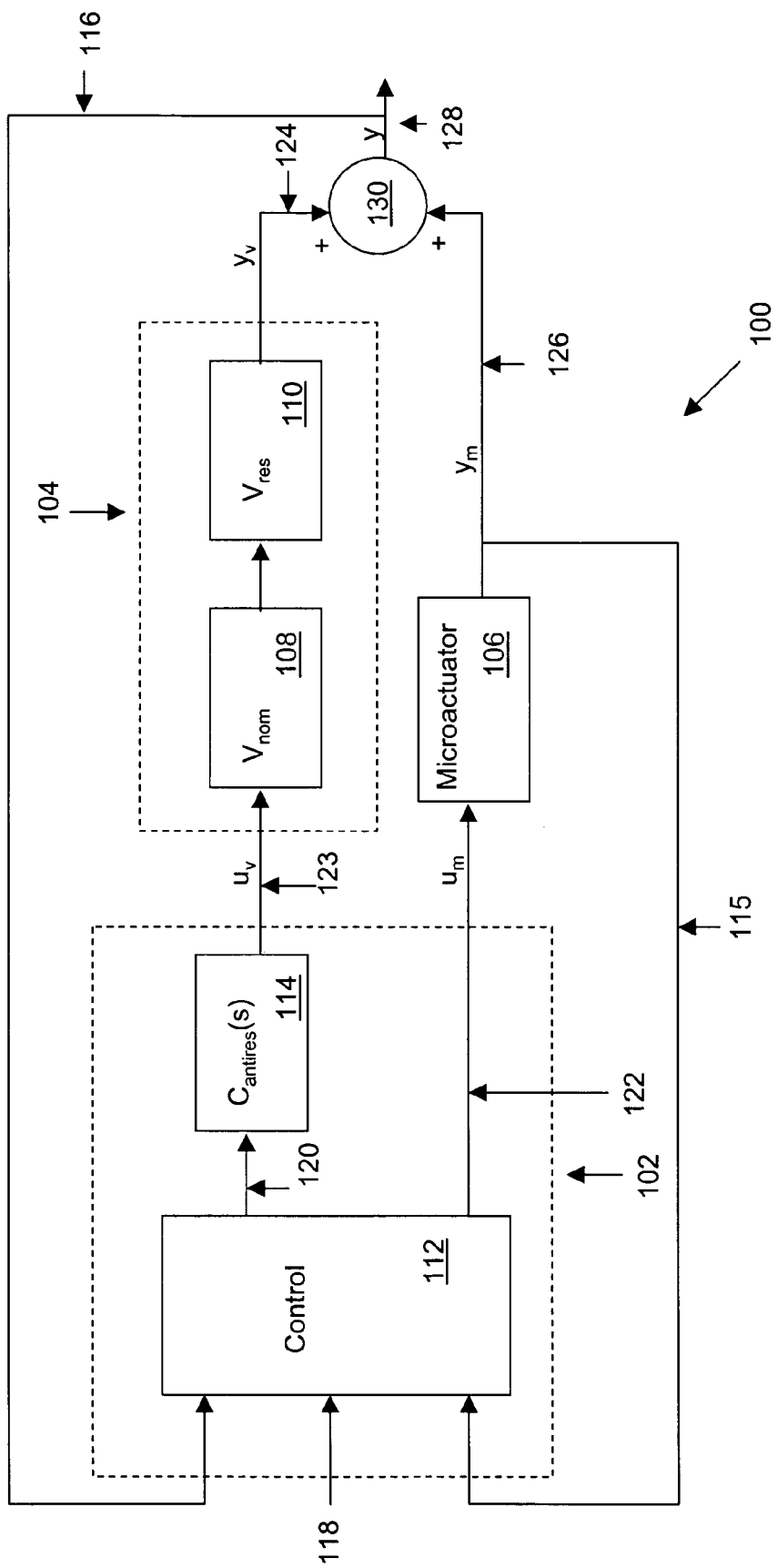
FIG. 1 is a block diagram illustrating a conventional control scheme for compensating the coarse actuators undesired transients in dual stage control systems.
Figure 2:
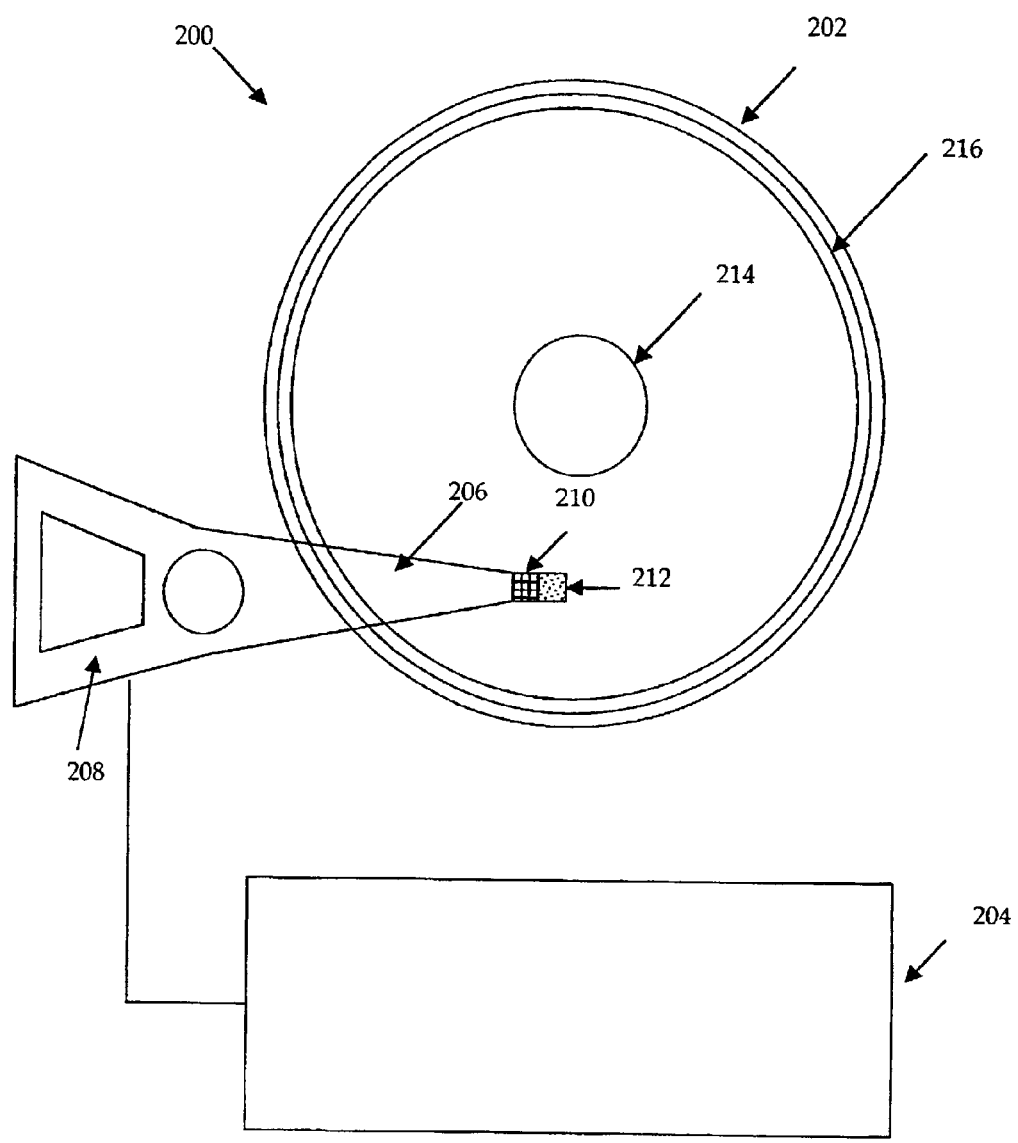
FIG. 2 depicts a data storage system that can be used with the present invention.

FIG. 2 depicts a data storage system that can be used with the present invention. Data storage system 200 in this exemplary embodiment is a hard disk drive system. Data storage system 200 includes one or more recording disks 202, a storage system controller 204, an actuator 206, a voice coil motor 208, a recording head 210, a microactuator 212, and a rotating spindle 214. The recording head 210 is positioned at the end of actuator 206 which is moved via voice coil motor 208, and transfers data between storage system controller 204 and a specific physical location on recording disk 202. Data is preferably stored in many approximately consecutively numbered concentric rings or "tracks" 216 on recording disk 202. For clarity, only two tracks are shown in FIG. 2. The tracks are displaced radially from each other, beginning at the inner diameter of a disk and continuing to the outer diameter.

For clarity only one recording disk 202 is shown in FIG. 2. The present invention, however, is not limited to such an arrangement. Data storage systems having multiple recording disks can also utilize the present invention. In multiple recording disk systems, each recording disk typically has a corresponding recording head. The present invention can be used for all of the recording heads together, or it can be implemented with each individual recording head.

Storage system controller 204 may randomly access a specific logical location on recording disk 202 via a particular track address and a particular sector address. Tracks 116 are very closely spaced in order to maximize storage capacity and economy. The mechanical precision of the movement of recording disk 202 and the movement of recording head 210 is critical to accessing the proper data storage location on recording disk 202. Storage system controller 204 thus requires some means for precisely positioning recording head 210 quickly and accurately over tracks 216 for subsequent storage and retrieval operations.

Figure 3:
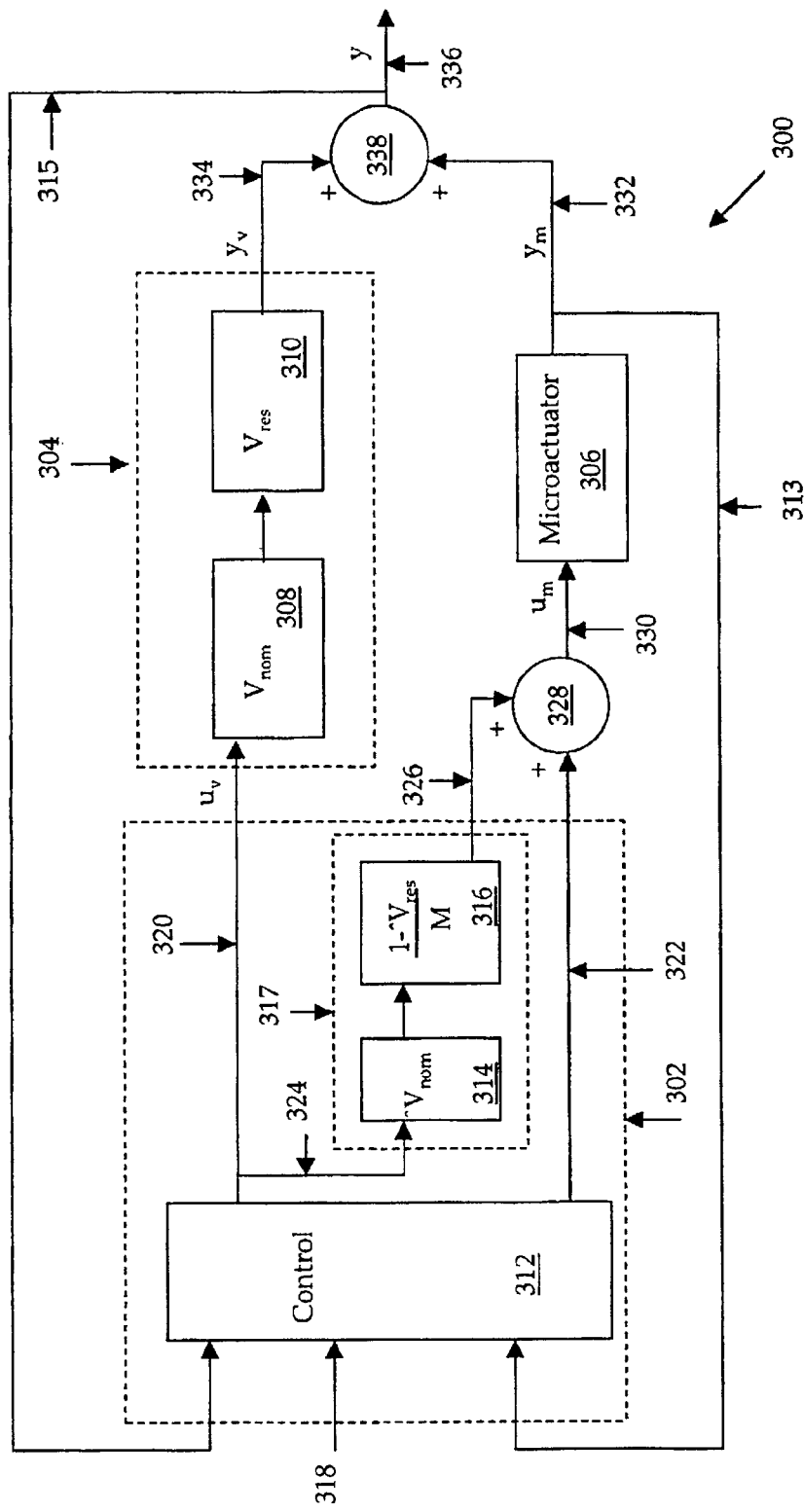
FIG. 3 is a block diagram illustrating an exemplary control scheme for compensating the coarse actuators undesired transients in dual stage control systems according to the present invention.

Referring to FIG. 3, a block diagram illustrates an exemplary control scheme for compensating the coarse actuators undesired transients in dual stage control systems according to the present invention. Blocks 308, 310, 314, 316, 328, and 338 represent mathematical functions that can be implemented in hardware and/or software.

The control scheme 300 includes a controller 302, a first positioning element 304 (e.g. a coarse actuator), and a second positioning element 306 (e.g. a microactuator). Microactuator 306 in this embodiment moves only the recording head, typically in distances that are microns in length. In another exemplary embodiment, the microactuator 306 moves the slider to which the recording head is mounted on.

The coarse actuator 304 is comprised of a $V_{nom}$ block 308 and a $V_{res}$ block 310. $V_{nom}$ is usually an ideal frictionless model, or transfer function, of the coarse actuator 304. For voice coil motor actuators, such as the ones found in hard disk drives, the most frequently used transfer function for the nominal model is $V_{nom}(s)=1/s^2$, where s is the Laplace transform operator. The resonant portion of the coarse actuator, $V_{res}$, is usually determined via finite element analysis of the mechanical structure and/or frequency domain measurements.

The controller 302 is comprised of a control block 312 and a compensation element 317. In this exemplary embodiment, the compensation element 317 is comprised of a first transfer function block 314 and a second transfer function block 316. Controller 302 is typically a state variable feedback controller. As discussed earlier, certain types of microactuators 306 allow explicit measurement of their displacement, and this measurement may be fed back to the controller 302 via line 313 Measurement of the current head position is fed back into the controller 302 via line 315.

The position of the recording head relative to the storage medium is measured by means of special servo marks written on, or formed in, the storage medium. A new position for the recording head is input into the controller 302 via line 318. Control block 312 then generates two signals on lines 320 and 322, respectively. The signal $u_v$ on line 320 is input into the coarse actuator 304 and causes the coarse actuator to move. The signal $u_v$ is also input into a feedforward line 324, where the compensation element 317 generates a compensation signal on line 326 that compensates for the coarse actuator's transient motion. In this exemplary embodiment, the compensation element 317 is a transfer function defined as:

$$\hat{V}_{nom}(z)\frac{1-\hat{V}_{res}(z)}{\hat{M}(z)}$$

This transfer function is applied to the signal $u_v$. $\hat{V}_{nom}(z)$ is a transfer function model of the nominal portion of the coarse actuator, $\hat{V}_{res}(z)$ is a transfer function model of the resonance portion of the coarse actuator, and $\hat{M}(z)$ is a transfer function model of the microactuator dynamics. The transfer function from $u_v$ to y is as follows:

$$\frac{y_v(z)}{u_v(z)} = V_{nom}(z)V_{res}(z) + \hat{V}_{nom}(z)\frac{1-\hat{V}_{res}(z)}{\hat{M}(z)}M(z)$$

Assuming that $\hat{V}_{nom} \approx V_{nom}$, $\hat{V}_{res} \approx V_{res}$, and $\hat{M} \approx M$, this transfer function becomes:

$$\frac{y_v(z)}{u_v(z)} \approx \hat{V}_{nom}(z)$$

Thus, the control scheme of the present invention effectively compensates for the resonances of the coarse actuator.

Returning to FIG. 3, the signal on line 322 and the compensation signal on line 326 are summed at block 328 and generate signal $u_m$ on line 330. The signal $u_m$ is then input into microactuator 306 to create the signal $y_m$ on line 332. The signal $y_m$ represents the positioning motion of the microactuator 306. The signal $u_v$ (on line 320) is input into the coarse actuator 304, where the transfer functions for $V_{nom}$ and $V_{res}$ are applied to the signal $u_v$ to generate a signal $y_v$ on line 334. In hard disk drive systems, $u_v$ is the current used to move the coarse actuator, and the signal $y_v$ represents the positioning motion of the coarse actuator. The position of the recording head (y) on line 336 is the sum of the coarse actuator's motion $y_v$ and the microactuator's motion $Y_m$, as shown in block 338.

Figure 4:
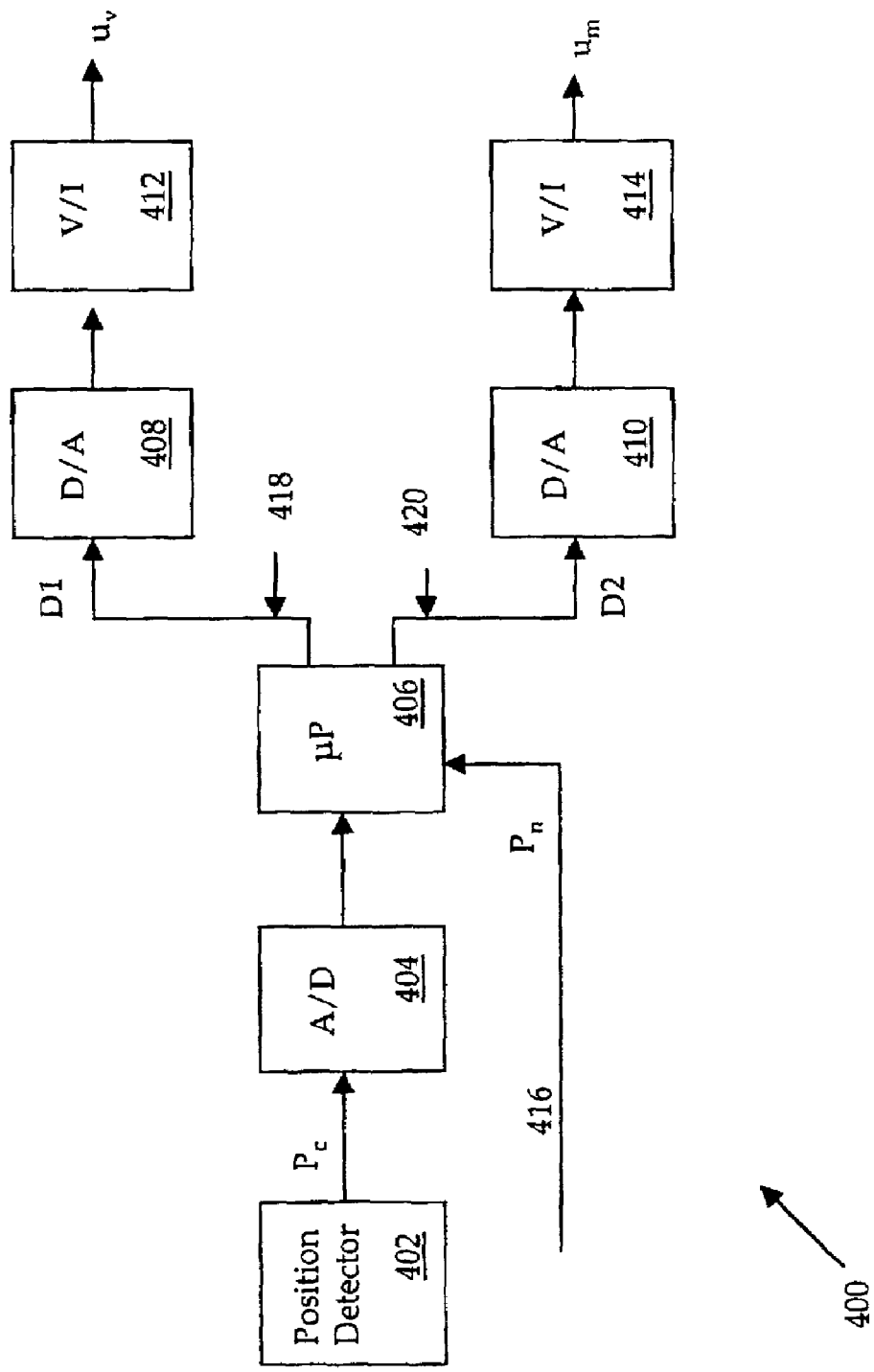
FIG. 4 is a block diagram depicting an exemplary controller for a dual stage control system according to the present invention.

FIG. 4 is a block diagram depicting an exemplary controller for a dual stage control system according to the present invention. Controller 400 is comprised of a position detector 402, an analog-to-digital converter 404, a microprocessor 406, digital-to-analog converters 408, 410, and voltage-to-current converters 412, 414. The position detector 402 determines the current position of the recording head and passes this value ($P_c$) to the analog-to-digital converter 404. The value ($P_c$) is converted to a digital value and then input into the microprocessor 406.

A new position for the recording head ($P_n$) is also input into microprocessor 406 via signal line 416. In this exemplary embodiment, the microprocessor 406 performs the calculations described with reference to FIG. 3 and outputs two signals on lines 418 and 420. These two digital values, D1 and D2, represent the amount of force that needs to be applied to the actuator and microactuator in order to move the recording head to its new position.

The digital values are then converted to analog signals via digital-to-analog converters (D/A) 408, 410. As discussed earlier, this embodiment is described with reference to a hard disk drive. Thus, current is input into the actuator and microactuator (not shown) in order to move these two elements. So the voltage values output by D/As 408, 410 are converted to current values via voltage-to-current converters (V/I) 412, 414. The output of V/I converter 412 is the signal $u_v$ described above. The output of V/I converter 414 is signal $u_m$, also described above.

In an alternative embodiment, a voltage signal is input into a microactuator, and not a current signal. In this alternative system the voltage-to-current converter 414 is not used, and the output of the digital-to-analog converter 410 is fed directly into the microactuator via an appropriate amplifier stage.

While the invention has been particularly shown and described with reference to a preferred embodiment, it will be understood by those skilled in the art that various changes in form and detail may be made therein without departing from the spirit and scope of the invention.

What is claimed is:

1. An apparatus, comprising:
  a coarse actuator:
  a microactuator;
  a controller adapted to control the positioning of the coarse actuator and the microactuator, and wherein the controller utilizes a compensation element in a feedforward line from a control signal of the coarse actuator to an input of the microactuator, and adapted to generates a compensation signal that compensates for at least one resonance of the coarse actuator by using a transfer function model of the coarse actuator.

2. The apparatus of claim 1, wherein the compensation element is comprised of a transfer function model of the microactuator.

3. The apparatus of claim 2, wherein the transfer function is defined as $\hat{V}_{nom}(z)(1-\hat{V}_{res}(z)/\hat{M}(z))$, where $\hat{V}_{nom}(z)$ is a transfer function model of a nominal portion of the coarse actuator, $\hat{V}_{res}(z)$ is a transfer function model of a resonance portion of the coarse actuator, and $\hat{M}(z)$ is a transfer function model of the microactuator.

4. The apparatus of claim 1, in which there is no notch filter between the controller and the coarse actuator.

5. An apparatus comprising:
  a control block configured to generate a coarse control signal and a compensation signal based on a transfer function model of the coarse actuator; and
  circuitry configured to generate a microactuator control signal based on the compensation signal.

6. The apparatus of claim 5, in which there is no notch filter between the control block and the coarse actuator.

7. The apparatus of claim 5 wherein the transfer function model of the coarse actuator comprises a nominal portion $\hat{V}_{nom}(z)$ and a Z) and a resonance portion $\hat{V}_{res}(z)$.

8. The apparatus of claim 5 wherein the transfer function model of the coarse actuator also includes a transfer function model of the microactuator $\hat{M}(z)$.

9. The apparatus of claim 8 wherein the transfer function model of the coarse actuator and microactuator is defined as $\hat{V}_{nom}(z)(1-\hat{V}_{res}(z)/\hat{M}(z))$.

10. The apparatus of claim 5 wherein the compensation signal is a feedforward signal.

11. The apparatus of claim 5 wherein the control block is configured to generate the compensation signal based on the coarse control signal.

12. The apparatus of claim 5 wherein the circuitry is configured to generate the microactuator control signal based on the compensation signal, in addition to a position error signal.

13. A method comprising the steps of:
generating a coarse control signal;
generating a compensation signal based on a model of a coarse actuator; and
generating a microactuator control signal based on the compensation signal.

14. The method of claim 13, wherein the step of generating the compensation signal based on the model of the coarse actuator comprises a step of applying a compensation element incorporating a transfer function model of the microactuator $\hat{M}(z)$ to the coarse control signal.

15. The method of claim 14, wherein the step of applying the compensation element uses a transfer function defined as $\hat{V}_{nom}(z)(1-\hat{V}_{res}(z)/\hat{M}(z))$, wherein $\hat{V}_{nom}(z)$ is a transfer function model of a nominal portion of the coarse actuator, and $\hat{V}_{res}(z)$ is a transfer function model of a resonance portion of the coarse actuator.

16. The method of claim 13 in which the coarse control signal is generated and is used by the coarse actuator without the use of any notch filter.

17. The method of claim 13 further comprising the step of constructing a modified control signal by summing the compensation signal and the microactuator control signal.

18. The method of claim 13 wherein the compensation signal is a feedforward signal.

19. The method of claim 13 wherein generating the compensation signal is also based on the coarse control signal.

20. The method of claim 13 wherein generating the microactuator control signal based on the compensation signal in addition to a position error signal.

* * * * *